US005774845A

United States Patent [19]

Ando et al.

[11] Patent Number: 5,774,845

[45] Date of Patent: Jun. 30, 1998

[54] INFORMATION EXTRACTION PROCESSOR

[75] Inventors: Shinichi Ando; Shinichi Doi, both of Tokyo, Japan

[73] Assignee: NEC Corporation, Tokyo, Japan

[21] Appl. No.: 304,945

[22] Filed: Sep. 13, 1994

[30] Foreign Application Priority Data

| | | | |
|---|---|---|---|
| Sep. 17, 1993 | [JP] | Japan | 5-230701 |
| Sep. 17, 1993 | [JP] | Japan | 5-230702 |
| Dec. 27, 1993 | [JP] | Japan | 5-330277 |

[51] Int. Cl.[6] .......... G06F 17/20

[52] U.S. Cl. .......... 704/231; 704/231; 704/246; 704/251

[58] Field of Search .......... 364/419.01–419.08; 704/1, 231, 246, 251

[56] References Cited

PUBLICATIONS

Ando et al., "Information Extraction Processor," 47th Assembly of Information Processing Society of Japan, Oct. 6–8, 1993, pp. 3–83–3–84.

Grishman, "Description of the Proteus System as used for MUC–4," The Proteus Project, New York University, pp. 233–241.

*Primary Examiner*—Gail O. Hayes
*Assistant Examiner*—Phillip Groutt
*Attorney, Agent, or Firm*—Foley & Lardner

[57] ABSTRACT

In a processor for extracting information on a specified field from a text described in a natural language, keywords and structural analysis are jointly used to improve the performance. When a set of keywords is divided in more than one sentence, this set of keywords is assembled by context defining words in a sentence. A multi-language summary generator uses this type of a processor.

9 Claims, 6 Drawing Sheets

TEXT INPUT UNIT 1
TEXT INFORMATION EXTRACTION UNIT 9
2 SYNTACTIC DICTIONARY
3 KEYWORD DICTIONARY
MORPHOLOGICAL ANALYZER 4
SYNTAX RULE FILE 5
KEYWORDS INTERRELATION RULE FILE 6
INFORMATION EXTRACTION UNIT 7
OUTPUT UNIT 8

FIG. 3

| CORPORATION | NEC |
| --- | --- |
| RELATION | DEVELOP |
| EQUIPMENT | SPUTTERING EQUIPMENT |

FIG. 4

| CORPORATION | × |
| --- | --- |
| RELATION | × |
| EQUIPMENT | × |

FIG. 5(a)

| CORPORATION | NEC |
| --- | --- |
| RELATION | DEVELOP |
| EQUIPMENT | SPUTTERING EQUIPMENT<br>CVD EQUIPMENT |

FIG. 5(b)

| CORPORATION | NEC<br>SUMITOMO METAL<br>INDUSTRIES, LTD. |
| --- | --- |
| RELATION | DEVELOP |
| | CVD EQUIPMENT |

FIG. 8

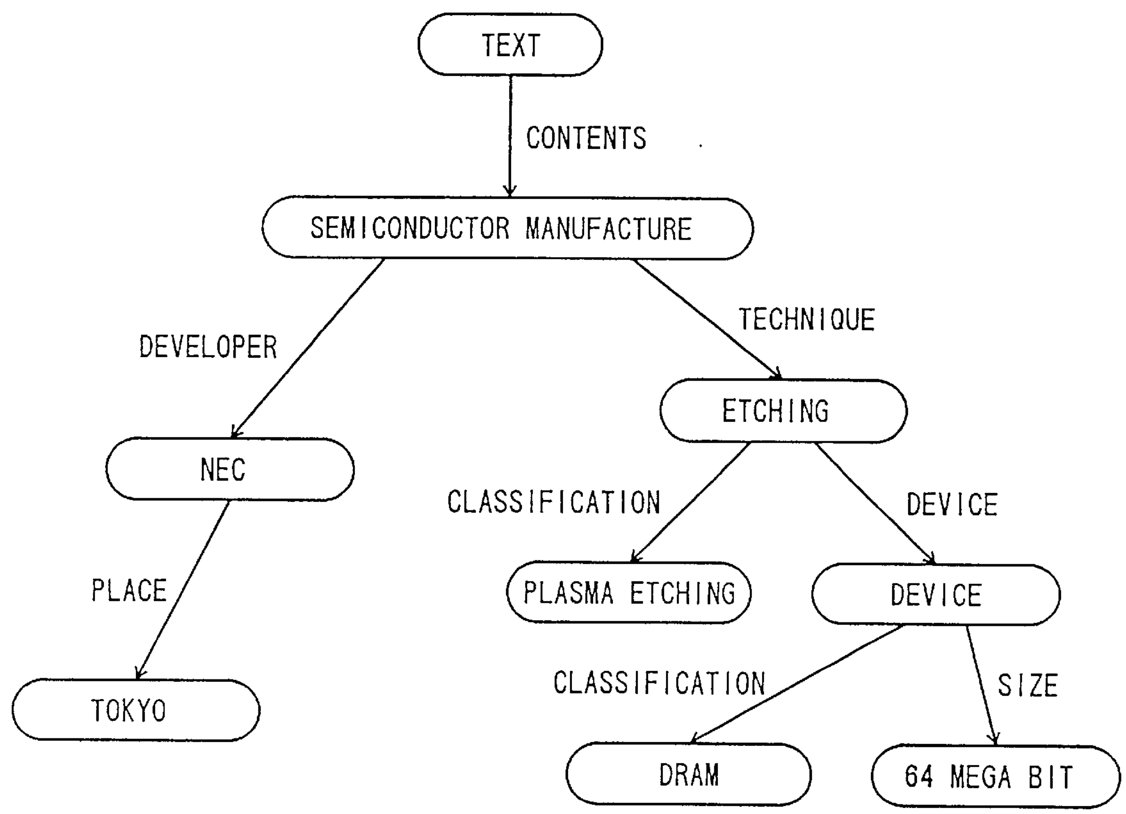

FIG. 9

NEC Corporation (Head Office in Tokyo) has announced that it has developed a new etching technique which is a necessary technique for producing 64 Mega bit (Mega = Million) DRAM.(Dynamic Random Access Memory. Dynamic means that the memory is required to be refreshed periodically for maintaing the memory contents). The new technique is called Super-ECR Plasma Etching. A new arrangement of the magnetic field for generating plasma state can generate plasma near an object wafer.

The corporation believes that nearly all the technical problems for fine processing of 64 Mega bit DRAM have been solved by the technique. (Original in Japanese)

In Japanese : 日本電気（東京）は６４メガビットＤＲＡＭ用のプラズマエッチング技術を開発した。

In English : NEC Corporation(Tokyo) has developed a method of plasma etching for 64 Mbit DRAM.

INFORMATION EXTRACTION PROCESSOR

BACKGROUND OF THE INVENTION

This invention relates to an information extraction processor for analyzing a text described in a natural language, for extracting information in a predetermined field from the analyzed text, and for expressing the extracted information in a predetermined form or in a natural language.

In heretofore known processes for extracting information in a sentence, there is a process for detecting occurrence of keywords, and a process for analyzing sentence structure. In using keywords, keywords are predetermined in accordance with the field of information to be extracted, and information is extracted when a keyword is detected in a sentence or a co-existence of keywords is detected in a sentence.

As keywords are increased, more items of information are extracted in the keyword process. But the extracted information may include inadequate information wherein there is no relation between words, as information is extracted whenever a keyword is detected, ignoring the sentence structure. And, it is impossible to extract information for a word which is not registered as a keyword.

In heretofore known process of sentence structure analysis, a sentence structure tree is obtained by syntactic analysis, and this tree is again analyzed to obtain a tree which expresses the information to be extracted. As the object of analysis is a sentence structure tree, however, a small difference of the sentence structure tree may result in a difference the extraction.

In a process of sentence structure analysis, the sentence structure is recognized as giving a correct extraction. But it is difficult to obtain a correct sentence structure tree, as vagueness on sentence structure is not eliminated by syntax only. Thus, there have been many cases when a process of sentence structure analysis cannot extract object information from an input text due to failure of the sentence structure analysis.

An information extraction processor can be used as a summary generator. The inventor of this invention has disclosed a part of his invention on Oct. 6–8, 1993 in a collected paper of lectures on the 47th Assembly of Information Processing Society of Japan, after filing his invention entitled “Information Extraction Processor” on Sep. 17, 1993 in the Japanese Patent Office. In the paper, the inventor alluded to a use of his invention as a summary generator. As for a summary generator, generation of a summary in multiple languages is desired. Various types of machine translation systems have been proposed, but the quality of translation is not good enough when used for translating a text including long sentences on general topics, such as a text from a newspaper. For example, in a clipping service of a newspaper, a summary of a description has, heretofore, been manually translated.

SUMMARY OF THE INVENTION

Therefore, an object of the present invention is to provide a processor wherein information is extracted when some keywords are detected in correct relation.

Another object of this invention is to provide a processor wherein a word is estimated to be a keyword when the word satisfies a predetermined keywords estimation rule even though the word is not detected as a keyword beforehand.

Still another object of this invention is to provide means for extracting information when a set of keywords is divided in more than one sentence. To materialize this object, a context defining word file and a context defining words relation rule file are provided.

Still another object of this invention is to provide a multi-language summary generator.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIG. 3 shows an example of input and output of FIG. 1.

FIG. 4 shows another example of input and output of FIG. 1.

FIG. 5 shows other examples of input and output of FIG. 1.

FIG. 8 shows an example of an analysis tree extracted at the text information extraction unit of FIG. 7.

FIG. 9 shows an example of an input text of FIG. 7.

DETAILED DESCRIPTION OF THE PREFERRED EMBODIMENTS

Figure 1:
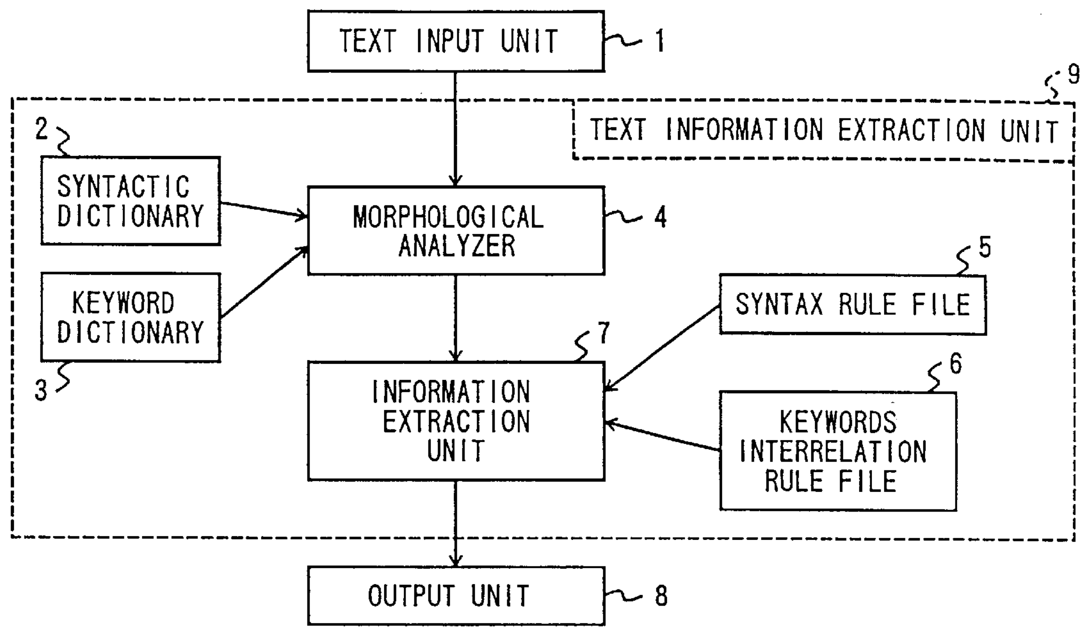
FIG. 1 shows a block diagram of an embodiment of this invention.

Referring to FIG. 1, a text of a natural language is input through a text input unit 1, to a morphological analyzer 4. A syntactic dictionary 2 stores morphemes with a syntactic attribute, and a keyword dictionary 3 stores keywords, which indicate the existence of information to be extracted, and a role for each keyword to be performed by the keyword at an output stage of the information.

At the morphological analyzer 4, the input text is divided into morphemes. Each morpheme, is appended with information from the syntactic dictionary 2 and the keyword dictionary 3, and is delivered to an information extraction unit 7, wherein a semantic structure is generated by referring to a syntax rule file 5 and a keywords interrelation rule file 6. An output unit 8 converts the semantic structure generated at the information extraction unit 7 to an output form.

Assume that the information to be extracted is who develops, manufactures, sells, or uses in a field of microelectronics. And further assume that the form of the output is defined as the OUTPUT of FIG. 3.

When the OUTPUT of FIG. 3 is displayed through the output unit 8, it is displayed as image patterns of characters in a natural language. But when the OUTPUT is extracted at the information extraction unit 7, it is represented by an arrangement of codes. The form of the OUTPUT of FIG. 3 represented by codes is called a semantic structure in this specification.

In this example, the keyword dictionary 3 contains keywords of a corporation (for example, “NEC”, keywords concerned with relation (for example, “DEVELOP”), keywords of microelectronics(for example, "SPUTTERING EQUIPMENT")and so on. Each of the keywords is registered with a frame structure to indicate the role of the keyword. For example, "NEC" is registered with the frame structure which means the word "NEC" indicates the corporation name NEC. "DEVELOP" is registered with a frame structure which means the word "DEVELOP" indicates a relationship between corporations and microelectronics techniques, and the relationship is DEVELOP in an output stage.

For example, when an input is "NEC has developed sputtering equipment.", the input is divided into each morpheme in the morphological analyzer 4, and contents of the syntactic dictionary 2 and the keyword dictionary 3 are assigned to each morpheme.

In the example, the keywords are NEC, DEVELOP, SPUTTERING EQUIPMENT, respectively. The information extraction unit 7 extracts the information, when these keywords have a relationship on syntax. And the output unit 8 delivers an output as shown in FIG. 3.

Figure 2:
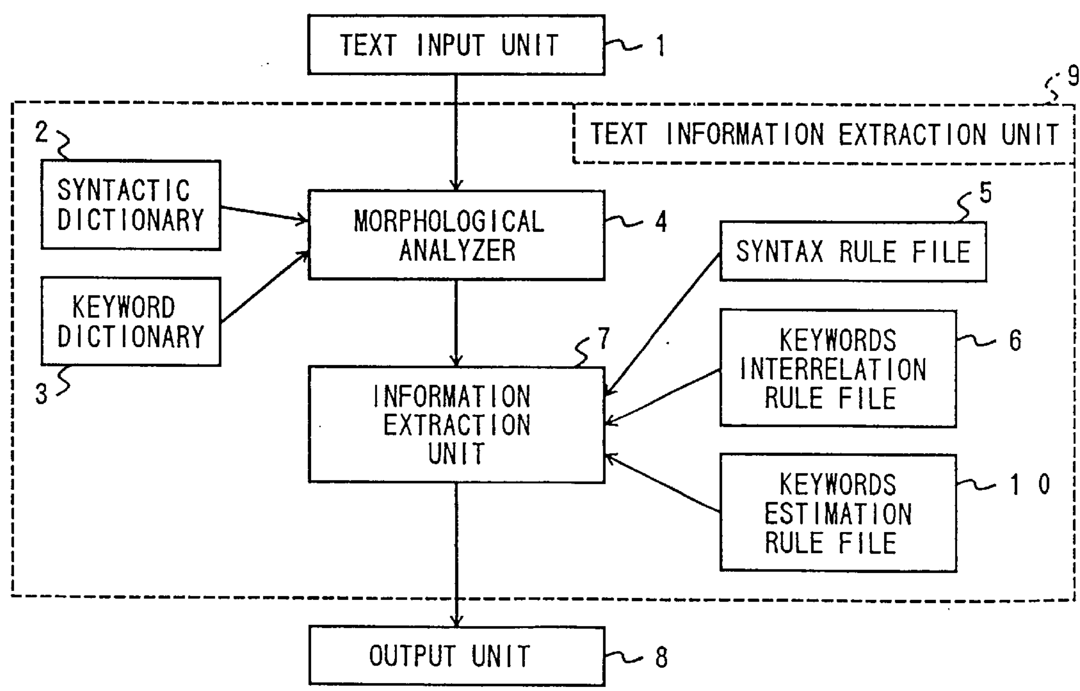
FIG. 2 shows a block diagram of another embodiment of this invention.

FIG. 2 shows a modification of an embodiment shown by FIG. 1. A keywords estimation rule file 10 stores rules for estimating a morpheme as a keyword even though the morpheme is not registered in the keyword dictionary 3. The estimation is based on a sentence structure where the morpheme is used.

Assume that "NEC" is not registered in the keyword dictionary 3, and the input text is as shown by INPUT in FIG. 3. By the processor shown in FIG. 1, the information is not extracted. But, in the keywords estimation rule file 10, there is a rule which means that if an unknown word is a subject of a relation keyword, the unknown word would be a CORPORATION. The information extraction unit 7 applies the keyword estimation rule, and estimates NEC as a keyword having a role of CORPORATION.

Thus, the OUTPUT of FIG. 3 is extracted even when NEC is not registered as a keyword.

For another example shown by FIG. 4, keywords NEC, DEVELOP, SPUTTERING coexist. What is developed by NEC, however, is not a microelectronics "sputtering" equipment , but a material. In the processor, the information extraction unit 7 analyzes the sentential structure in which the object of the verb "develop" is not microelectronic technique, but a word "material" that is not a keyword. And this output is as shown by the OUTPUT of FIG. 4.

In Japanese sentences, there are many ambiguities. Assume that there are two sentences which have meanings:

1. NEC(A) has developed(X) sputtering equipment(B1) and CVD equipment(C).
2. NEC(A) has developed a CVD equipment(C) with SUMITOMO METAL INDUSTRIES, LTD(B2).

When these two sentences are expressed in Japanese, the verb comes at the end of the sentence, and the two sentences will become as shown by 3. A-wa B1-to C-wo X
4. A-wa B2-to C-wo X In Japanese grammar, both B1 and B2 take the same preposition "to", and the Japanese sentence (A-wa B-to C-wo X) means either "A have developed C with B." or "A has developed B and C."

This ambiguity is eliminated in an embodiment of this invention, since keyword dictionary 3 stores a role of each keyword to be performed by the keyword at output stage of the information.

In FIG. 5(*a*) an input shows the meaning of a Japanese ambiguous text(A-wa B-to C-wo X). In this invention, "sputtering equipment" is a keyword which means EQUIPMENT, and analysis of a sentence structure results in that the sentence structure is 3. "A-wa B1-to C-wo X". and the invention gets an output shown by FIG. 5(*a*) wherein CORPORATION(NEC), RELATION(DEVELOP), EQUIPMENT(SPUTTERING EQUIPMENT, CVD EQUIPMENT). And when an input is an ambiguous sentence as shown by FIG. 5(*b*), a correct information is extracted wherein CORPORATION(NEC, SUMITOMO METAL INDUSTRIES), RELATION(DEVELOP), EQUIPMENT(CVD EQUIPMENT), since "SUMITOMO METAL INDUSTRIES" is a keyword which means CORPORATION.

There are many cases when an information to be extracted is divided across more than one sentence. For extracting an information from more than one sentence, the processor must have a sufficient knowledge about interrelations between these sentences.

The knowledge about interrelations between sentences are stored in a context defining word file, and a context defining words relation rule file. The context defining word file stores information on words defining context, and the context defining word relation rule file contains relation rules between context defining words.

One of the most important keys to recognizing the relation among the sentences is an anaphoric expression, which refers to another element in the text. The information extracted from each sentence can be related by determining the antecedents of each anaphoric expression. Here, "anaphoric expression" includes not only pronoun and demonstrative expression, but also ellipsis(zero pronoun) and co-reference a represented by general nouns, etc. The context defining word file should store information on these anaphoric expressions and their antecedents, and the context defining words relation rule file should contain relation rules between anaphoric expressions and their antecedents.

For example, suppose that an information referring to names of corporations which are developing(manufacturing, selling, or using) etching equipment or lithography equipment to be used in semiconductor production process, is to be extracted. When an input text is "NEC has developed etching equipment.", the processor of FIG.1 can extract easily the requested information wherein CORPORATION (NEC), RELATION(DEVELOP), EQUIPMENT (ETCHING EQUIPMENT). When an input text is "CIT Alcatel announced that the company is going to set up a joint company with CANON SALES Co., Inc. The company has been selling etching equipment.", the requested information is not extracted independently from either sentence, since the first sentence has no keyword for equipment, and the second sentence has no keyword for a corporation name. But, in the first sentence, there are corporation names "CIT Alcatel" and "CANON SALES Co., Inc". These words are extracted with the appearance environments and can be antecedents of an anaphoric expression or supplementary words for ellipsis. And in the second sentence, an information for CORPORATION(THE COMPANY-an anaphoric expression), EQUIPMENT(ETCHING EQUIPMENT), RELATION(SELL) is extracted. Thus, from a text of the two sentences, the required information is extracted.

Figure 6:
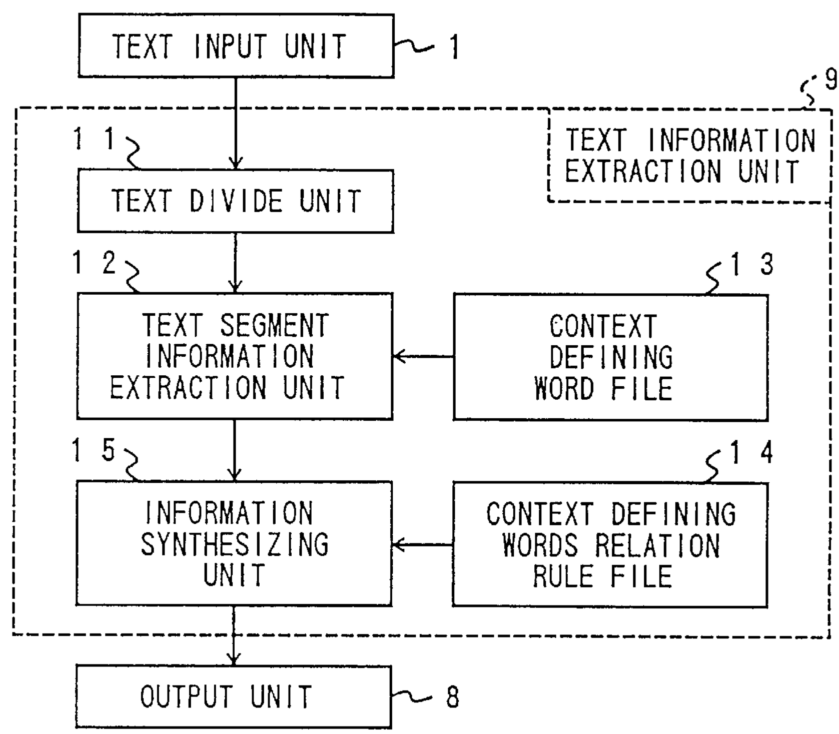
FIG. 6 shows a block diagram of still another embodiment of this invention.

FIG. 6 shows an embodiment of this invention wherein an information is extracted from more than one sentence. Referring to FIG. 6, a text input unit 1 delivers a text to a text divide unit 11, where the input text is divided into more than one sentence(in a generalized expression, into text segments), for example, "CIT Alcatel announced that the company is going to set up a joint company with CANON SALES Co., Inc." and "The company has been selling etching equipment."

A text segment information extraction unit 12 refers to a context defining word file 13 for extracting information on semiconductor production process and context defining words included in each sentence. In the first sentence, there is no description directly mentioning information relating to a semiconductor production process. But, the corporation names "CIT Alcatel" and "CANON SALES Co., Inc." are extracted with the appearance environments and stored as antecedent candidates. These words can be antecedents for an anaphoric expression or supplementary words for ellipsis. From the second sentence an information for CORPORATION (THE COMPANY-an anaphoric expression), EQUIPMENT(ETCHING EQUIPMENT), RELATION (SELL) is extracted. Then, an information synthesizing unit 15 synthesizes the information extracted from the two sentences in accordance with context defining words connection rules stored in a context defining words relation rule file 14. For example, a rule says that "When an anaphoric expression is extracted from a sentence, the antecedent candidate in the nearest preceding sentence is determined as the antecedent of the anaphoric expression. In case when there are more than one antecedent candidate in the preceding sentence, the candidate which is the subject of the sentence is determined as the antecedent."

From this rule described in the context defining words relation rule file 14, THE COMPANY in the second sentence is determined to be CIT Alcatel in the first sentence. Thus, information synthesized in the information synthesizing unit 15 is CORPORATION(CIT Alcatel), RELATION(SELL), EQUIPMENT(ETCHING EQUIPMENT).

Suppose that an information is extracted from the same text by using only keywords CORPORATION NAME, EQUIPMENT, RELATION (descriptive word for describing relation). In this case, the processor can not determine that either "CIT Alcatel" or "CANON SALES Co., Inc." has been selling etching equipment. And even if the processor can process anaphoric expressions, when it ignores the sentence structure, it may determine "CANON SALES Co., Inc." as the antecedent of the anaphoric expression "The company", because "CANON SALES Co., Inc." is nearer than "CIT Alcatel" to "The company" in the text.

For a second example, suppose that an input text states: "Applied Materials Japan (AMJ) has developed RIE equipment. This equipment can process DRAM up to 4 Mega bit". In this case, the information synthesizing unit 15 searches a preceding correspondent word in the first sentence for the anaphoric expression "this equipment" in the second sentence and finds the nearest correspondent antecedent "RIE equipment". Thus, an information extracted says:

CORPORATION(AMJ),
RELATION(DEVELOP),
APPARATUS(RIE EQUIPMENT),
DEVICE(DRAM),
DEVICE SIZE(4M).

In the preceding examples, an anaphoric expression and the antecedent meant an identical item. But, there are cases where an anaphoric expression and the antecedent are not identical. For an example, suppose a text states: "NIKON Inc., which is one of the largest companies in Japan, puts on the market a new type of stepper. CANON Inc. is selling the same kind of equipment, and semiconductor manufacturers are now evaluating the equipment." From this text, an information is to be extracted which says CORPORATION (CANON Inc.), RELATION(SELL), EQUIPMENT (STEPPER), in addition to an information which says CORPORATION(NIKON Inc.), RELATION(SELL), EQUIPMENT(STEPPER).

In this case, "the same kind of equipment" in the second sentence is an anaphoric expression which indicates a nearest antecedent "stepper" in the first sentence. This correspondence is analyzed in the information synthesizing unit 15. But it is apparent that the stepper is not identical with the stepper which NIKON Inc. has put on a market. Therefore, the anaphoric expression "the same kind of equipment" must be treated as different equipment from the antecedent, and having the same attribute with the antecedent.

In one embodiment of this invention shown in FIG. 6, the context defining words file 13 contains rules defining that "an anaphoric expression accompanied by a prefix(Japanese Grammar), for example, "above mentioned" or by a modifier(Japanese Grammar), "this" should be understood as indicating an identical item, and an anaphoric expression accompanied by an epithet (Japanese Grammar), for example, "a same kind" should be understood as indicating a nonidentical item."

In the context defining words relation rule file 14, different rules are stored for connecting correspondent expressions, in accordance with an identical item or a nonidentical item.

In a Japanese text, a subject of a sentence is often omitted when the subject is recoverable from the context. For example, in a Japanese text meaning "Ram Research Corp. has a share of 45% in South East Asia in dry etching equipment. The company is manufacturing and selling the etching equipment in Japan in co-operation with Sumitomo Metal Industries, Ltd.", the subject of the second sentence (The company) is often omitted in a Japanese text, since this is easily recovered from the first sentence. For such ellipsis of a subject, the context defining words relation rule file 14 contains a rule for defining that a word "sell" which is a keyword representing "RELATION" must have a subject since the word is a verb, that a corporation name is the subject of the verb, and that the supplementary word for the ellipsis is in the preceding sentence.

The information synthesizing unit 15 refers to the context defining words relation rule file 14, and extracts two items of information saying:

CORPORATION(LAM RESEARCH CORP.),
RELATION(MANUFACTURE, SELL),
EQUIPMENT(DRY ETCHING EQUIPMENT). and
CORPORATION(LAM RESEARCH CORP. SUMITOMO METAL INDUSTRIES, LTD.)
RELATION(MANUFACTURE, SELL),
EQUIPMENT(DRY ETCHING EQUIPMENT).

In the embodiment described in connection with FIG. 6, a prefix "the same" and a modifier "this" versus an epithet (all in Japanese Grammar) are considered, but this invention can use other anaphoric expressions wherein the correspondence is indicated by a same noun or by such a sentence structure as a cleft sentence. A definite article in English or a European Grammar can also be used as an anaphoric expression.

In a heretofore method of summary generation, a weight of importance is evaluated for each sentence in a text, from important words or specified words, or from an expression at the end of the sentence or from a conjunction. As the object of the method is to generate a summary of a general purpose text, it cannot cope with various linguistic phenomena, and cannot obtain an output on user's view.

As has been described in a foregoing paragraph, the inventor has disclosed to use an information extraction processor for generating a summary. In this former disclosure, a specified information is extracted in accordance with keywords predetermined in relation to an object field of extraction and with keywords interrelation rules using sentence structure, and the extracted information is given in a frame style. But the frame style expression is difficult to be interpreted, especially when the user is not acquainted with the definition of each slot in a frame.

Figure 7:
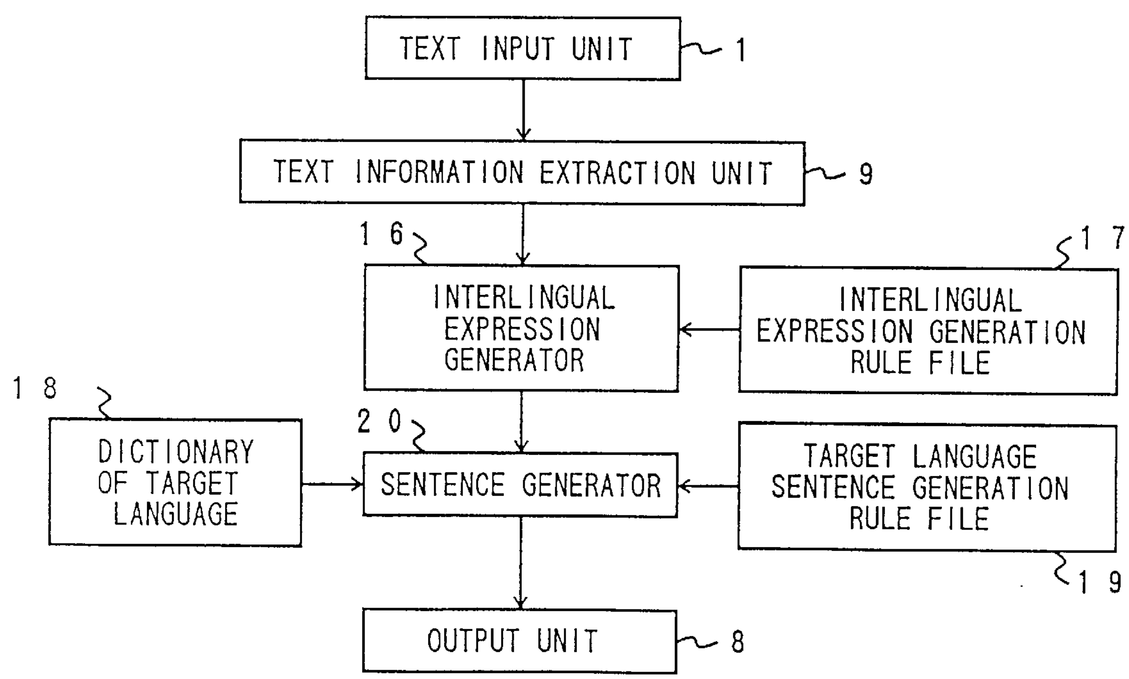
FIG. 7 shows a block diagram of still another embodiment of this invention.

An embodiment of this invention shown by FIG. 7 can solve the problems in the former disclosure.

A text described in a natural language is delivered from the text input unit 1 to a text information extraction unit 9. The text information extraction unit 9 extracts the specified object of information in frame structures.

An interlingual expression generation rule file 17 stores rules for converting the frame structure extracted by the text information extraction unit 9, into an interlingual expression, or when necessary, into plural interlingual expressions expressing sentences. An interlingual expression generator 16 receives the frame structure extracted by the text information extraction unit 9, and converts the received frame structure into an interlingual expression expressing a sentence in accordance with the rules stored in the interlingual expression generation rule file 17.

A dictionary of target language 18 stores correspondence between an interlingual expression and a word of target language, and a target language sentence generation rule file 19 stores rules for composing a sentence in the target language(natural language). A sentence generator 20 receives the interlingual expression from the interlingual expression generator 16, and referring to the dictionary of the target language 18 and the target language sentence generation rule file 19, composes a sentence of natural language in the target language for each interlingual expression received from the interlingual expression generator 16.

An output unit 8 displays the sentence generated at the sentence generator 20.

Suppose that users of the multi-language summary generator request to be informed on a microelectronic technique in which "What corporation is developing(or manufacturing, selling, using) what kind of microelectronic technique." And suppose that the frame structure form of the text information extraction unit 9 is determined as shown by FIG. 8. FIG. 8 shows relations between keywords, wherein the information being NEC as the developer and etching as the technique. And here are shown that NEC is in Tokyo, and the etching is a plasma etching applicable to 64 Mega bit DRAM.

Suppose a text shown in FIG.9 (original text is described in Japanese) is delivered through the text input unit 1 to the text information extraction unit 9. The text information extraction unit 9 analyzes the input text and arranges the result in a specified form as shown by FIG. 8.

Figures 10, 11:
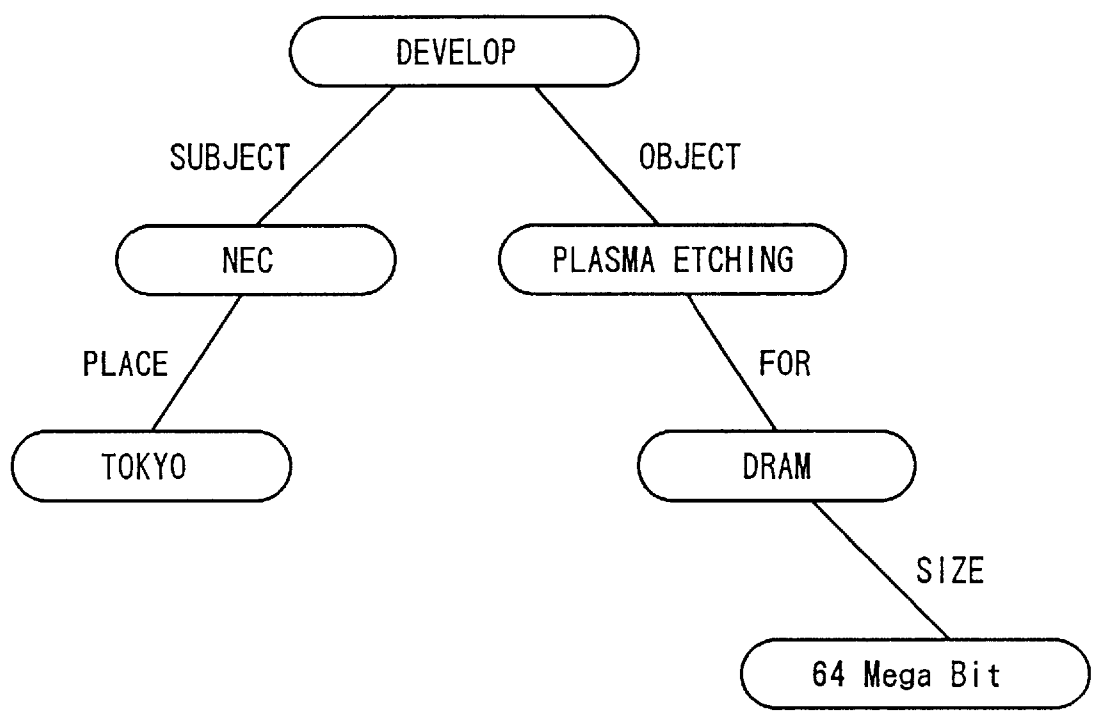
FIG. 10 shows an example of an output of the interlingual expression generator of FIG. 7.
FIG. 11 shows an example of an output of the sentence generator of FIG. 7.

The interlingual expression generator 16 receives the frame structure as shown in FIG.8, and converts the structure into an interlingual expression shown in FIG. 10, applying rules stored in the interlingual expression generation rule file 17. In FIG.10, the descriptive word (Japanese Grammar) "DEVELOP" comes in the center of a tree, a subject "NEC" and an object "PLASMA ETCHING" make two branches, when the information to be extracted is "What corporation is developing(or manufacturing, selling, using) what kind of technique in microelectronics technique. Rules for text sectionalization are predetermined and stored as rules in the interlingual expression generation rule file 17. When the information extracted by the text information extraction unit 9 is complex, the interlingual expression generator 16, referring to the interlingual expression generation rule file 17, can represent an extracted information by plural trees.

The sentence generator 20 receives the interlingual expression from the interlingual expression generator 16, and composes a sentence in the target language, referring to the dictionary of target language 18 and the target language sentence generation rule file 19.

FIG. 11 shows a Japanese sentence and an English sentence composed from an interlingual expression shown in FIG. 10. An output unit 8 displays the sentence composed by the sentence generator.

In an embodiment shown in FIG. 7, the user of the summary generator specifies an object field of information by keywords and can set the output form by defining a frame structure, to obtain a summary accurately on the user's view.

The object field of information can be changed in accordance with the user's intention, and the embodiment can supply various kinds of summaries in different fields of information. As a summary is extracted from a sentence structure analysis around keywords, a frame structure and interlingual expression are obtained without ambiguity. For expressing the summary in a target language, the translation is performed from the formed structure to give a high-quality multi-language summarization.

What is claimed is:

1. An information extraction processor comprising:

a text input unit for receiving an object text described in a natural language;

a syntactic dictionary for storing morphemes with syntactic attributes;

a keyword dictionary for storing keywords of information to be extracted, and a role of each keyword to be performed by said keyword at an output stage of said information;

a morphological analyzer connected to said text input unit for dividing said text input into morphemes composing said text, and is connected to said syntactic dictionary and to said keyword dictionary for assigning contents of said syntactic dictionary and said keyword dictionary to each morpheme;

a syntax rule file for storing rules for analyzing sentence structure by using said syntactic attributes stored in said syntactic dictionary and said information stored in said keyword dictionary;

a keywords interrelation rule file for storing rules for generating a semantic structure of indicating relations between keywords through controlling the syntax rule by keyword information assigned to keywords;

an information extraction unit connected to said morphological analyzer, to said syntax rules file, and to said keywords interrelationship rule file for analyzing a sequence of morphemes received from said morphological analyzer, with syntax rules stored in said syntax rule file and with keyword interrelation rules stored in said keywords interrelation rule file, to generate a semantic structure indicating relations between keywords; and an output unit connected to said information extraction unit for converting said semantic structure indicating relations between keywords to displayed image patterns.

2. An information extraction processor of claim 1, further provided with a keywords estimation rule file connected to said information extraction unit for storing rules for estimating an unknown word, which is not registered in said keyword dictionary as a keyword, from a sentence structure, said information extraction unit analyzing a sequence of morphemes received from said morphological analyzer with syntax rules stored in said syntax rule file, with keywords interrelation rules stored in said keywords interrelation rule file, and with keyword estimation rules stored in said keywords estimation rule file to generate a semantic structure indicating relations between keywords.

3. An information extraction processor comprising:

a text input unit for receiving an object text described in a natural language;

a text divide unit connected to said text input unit for dividing said text received from said text input unit into text segments;

a context defining word file for storing information on words in a specific field of interest for defining context;

an information extraction unit connected to said text divide unit and to said context defining word file for extracting text segment information from said text segments received from said text divide unit, and for detecting context defining words in said text segments with reference to said information on words defining context stored in said context defining word file;

a context defining words relation rule file for storing relation rules between context defining words;

an information synthesizing unit connected to said text information extraction unit and to said context defining words relation rule file for synthesizing information on said input text, from said text segment information extracted by said information extraction unit and appended by information on detected context defining words, in accordance with relation rules between context defining words stored in said context defining words relation rule file; and an output unit connected to said information synthesizing unit for producing displayed image patterns of said information synthesized at said information synthesizing unit.

4. An information extraction processor of claim 3, wherein said context defining word file stores information on anaphoric expressions used for referring to other structural elements and information on words which can be antecedents corresponding to anaphoric expressions, and said context defining words relation rule file stores rules for determining an antecedent to an anaphoric expression.

5. An information extraction processor of claim 4, wherein said context defining word file stores information on anaphoric expressions used for referring to other structural elements, information for deciding whether an anaphoric expression means identity or nonidentity with antecedent words, and information on words which can be antecedents corresponding to anaphoric expressions, and wherein said context defining words relation rule file stores rules for synthesizing said information on said input text when said anaphoric expression is decided to mean identity with an antecedent word by referring to said context defining word file, and rules for synthesizing said information on said input text when said anaphoric expression is decided to be non-identical to an antecedent word.

6. An information extraction processor of claim 5, wherein said context defining word file stores information for detecting an ellipsis in a sentence and information of words which can replenish an ellipsis, and said context defining words relation rule file stores rules for determining a word which can replenish an ellipsis.

7. An information extraction processor of claim 4, wherein said context defining word file stores information for detecting an ellipsis in a sentence and information of words which can replenish an ellipsis, and said context defining words relation rule file stores rules for determining a word which can replenish an ellipsis.

8. An information extraction processor of claim 3, wherein said context defining word file stores information for detecting an ellipsis in a sentence and information of words which can replenish an ellipsis, and said context defining words relation rule file stores rules for determining a word which can replenish an ellipsis.

9. An information extraction processor for generating a multi-language summary comprising:

a text input unit for receiving an object text described in a natural language;

a text information extraction unit connected to said text input unit for extracting specified information as a semantic structure in accordance with keywords and a sentence structure;

an interlingual expression generation rule file for storing rules for converting said semantic structure extracted at said text information extraction unit, into an interlingual expression expressing a sentence, or, when necessary, into plural interlingual expressions expressing sentences;

an interlingual expression generator connected to said text information extraction unit and to said interlingual expression generation rule file for converting said semantic structure extracted at said text information extraction unit, into an interlingual expression expressing a sentence, or when necessary, into plural interlingual expressions expressing sentences, referring to rules stored in said interlingual expression rule file;

a dictionary of a target language for storing correspondence between an interlingual expression and a word of target language;

a target language sentence generation rule file for storing rules for composing a sentence of said target language from said interlingual expression expressing a sentence; and a sentence generator connected to said interlingual expression generator, to said dictionary of a target language, and to said target language sentence generation rule file for composing a sentence in a natural language from said interlingual expression in accordance with information stored in said dictionary of target language and with rules stored in said target language sentence generation rule file.

* * * * *